(12) United States Patent
Krishnamoorthi et al.

(10) Patent No.: US 8,259,865 B2
(45) Date of Patent: Sep. 4, 2012

(54) METHODS AND APPARATUS FOR ADAPTING CHANNEL ESTIMATION IN A COMMUNICATION SYSTEM

(75) Inventors: Raghuraman Krishnamoorthi, San Diego, CA (US); Krishna Kiran Mukkavilli, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 12/396,144

(22) Filed: Mar. 2, 2009

(65) Prior Publication Data
US 2009/0245333 A1 Oct. 1, 2009

Related U.S. Application Data

(60) Provisional application No. 61/039,968, filed on Mar. 27, 2008.

(51) Int. Cl.
*H04L 27/06* (2006.01)
(52) U.S. Cl. ....... 375/340; 375/219; 375/316; 375/343; 375/350; 370/272; 370/273; 370/276; 370/297; 455/73; 455/130
(58) Field of Classification Search ............... 375/219, 375/316, 340, 343, 350; 370/272, 273, 276, 370/297; 455/73, 130
See application file for complete search history.

(56) References Cited

U.S. PATENT DOCUMENTS

| 7,466,779 B2 | 12/2008 | Juntti et al. |
| 2004/0076244 A1 | 4/2004 | Juntti et al. |
| 2006/0227887 A1 | 10/2006 | Li et al. |
| 2007/0147533 A1 | 6/2007 | Thomas et al. |
| 2007/0153922 A1 | 7/2007 | Ding et al. |

FOREIGN PATENT DOCUMENTS

| WO | 2005074218 | 8/2005 |
| WO | 2006020036 | 2/2006 |
| WO | 2007106119 | 9/2007 |

OTHER PUBLICATIONS

International Search Report, PCT/US2009/036081, International Searching Authority, European Patent Office, Nov. 17, 2009.
Written Opinion, PCT/US2009/036081, International Searching Authority, European Patent Office, Nov. 17, 2009.
International Preliminary Report on Patentability, PCT/US2009/036081, International Preliminary Examining Authority, European Patent Office, Jun. 15, 2010.

*Primary Examiner* — Leon Flores
(74) *Attorney, Agent, or Firm* — Ryan N. Farr

(57) ABSTRACT

Methods and apparatus for adapting a channel estimation scheme in a transceiver in a communication system are disclosed to adapt channel estimation to the transceiver environment, particularly for high Doppler environments. The disclosed methods and apparatus effect determination of an estimate of a power delay profile of a channel or a time correlation of the channel, or both. A channel estimation scheme is then determined based on at least one of the determined power delay profile and time correlation of the channel. By basing determination of a channel estimation scheme on the power delay profile and/or the time correlation of the channel, the channel estimation scheme is adapted to the particular environment of the transceiver by accounting for the delay spread of the channel and/or the speed of the transceiver.

52 Claims, 10 Drawing Sheets

US 8,259,865 B2

METHODS AND APPARATUS FOR ADAPTING CHANNEL ESTIMATION IN A COMMUNICATION SYSTEM

CLAIM OF PRIORITY UNDER 35 U.S.C. §119

The present application for patent claims priority to Provisional Application No. 61/039,968 entitled "DOPPLER ESTIMATION FOR FLO RECEIVERS" filed Mar. 27, 2008, and assigned to the assignee hereof and hereby expressly incorporated by reference herein.

BACKGROUND

1. Field

The present disclosure generally relates to methods and apparatus for adapting channel estimation in a communication system, and more particularly to adapting channel estimation schemes to optimize channel estimation in high Doppler environments.

2. Background

In particular wireless networks including those operating using Orthogonal Frequency Division Multiplexing (OFDM), a receiver in such networks may utilize channel estimation to accurately recover transmitted data. That is, the channel estimate models the wireless transmission channel to account for amplitude and phase shifts due to the frequency selective and time-varying nature of the channel to afford accurate time tracking, and thus demodulation of a signal. In certain communication systems, channel estimation may be assisted by transmitting reference values or pilot signal in predetermined subcarrier frequencies, where the pilot signals are then used to calculate the channel estimate.

Since the channel estimate is important for accurately recovering the transmitted data, degradation in the quality of the channel estimation presents deleterious effects to demodulation and decoding of transmitted data. One factor known to degrade the channel estimation is increased speeds of a receiver relative to the transmitter (i.e., high Doppler environments). In order to account or correct for this degradation to maintain channel estimation quality, it is known to tune the channel estimation scheme to the Doppler by performing a correlation to determine how quickly the received waveform changes. Optimizing the channel estimation scheme, however, is difficult at higher speeds. Accordingly, enhancement of performance of the channel estimation for higher speeds through improved optimization is desirable.

SUMMARY

According to an aspect a method for adapting a channel estimation scheme in a transceiver in a communication system is disclosed. The method includes determining at least one of an estimate of a power delay profile of a channel and a time correlation of the channel. The method further includes determining a channel estimation based on at least one of the determined power delay profile and time correlation of the channel.

According to another aspect, a transceiver in a communication system is disclosed. The transceiver comprises a processor configured to determine at least one of an estimate of a power delay profile of a channel and a time correlation of the channel. The processor is further configured to determine a channel estimation scheme based on at least one of the determined power delay profile and time correlation of the channel.

According to yet another aspect, an apparatus for adapting a channel estimation scheme in a transceiver in a communication system is discloses. The apparatus includes at least one of means for determining an estimate of a power delay profile of a channel and means for determining a time correlation of the channel. The apparatus also includes means for determining a channel estimation scheme based on at least one of the determined power delay profile and time correlation of the channel.

According to yet one further aspect, a computer program product comprising: computer-readable medium is disclosed. The computer-readable medium includes code for causing a computer to determine at least one of an estimate of a power delay profile of a channel at a transceiver and a time correlation of the channel at the transceiver. Additionally, the computer-readable medium includes code for causing a computer to determine a channel estimation scheme based on at least one of the determined power delay profile and time correlation of the channel.

DETAILED DESCRIPTION

In accordance with the present disclosure, method and apparatus for optimizing channel estimation in high Doppler environments and known pilot patterns in communication frames are disclosed. More specifically, the presently disclosed methods and apparatus afford optimized selection of an appropriate channel estimation scheme (e.g., selecting a time filter) as a function of the power delay profile and the speed (i.e., Doppler) of a receiver, engendering an improvement in the performance of OFDM transceiver devices in high Doppler environments.

Figure 1A:
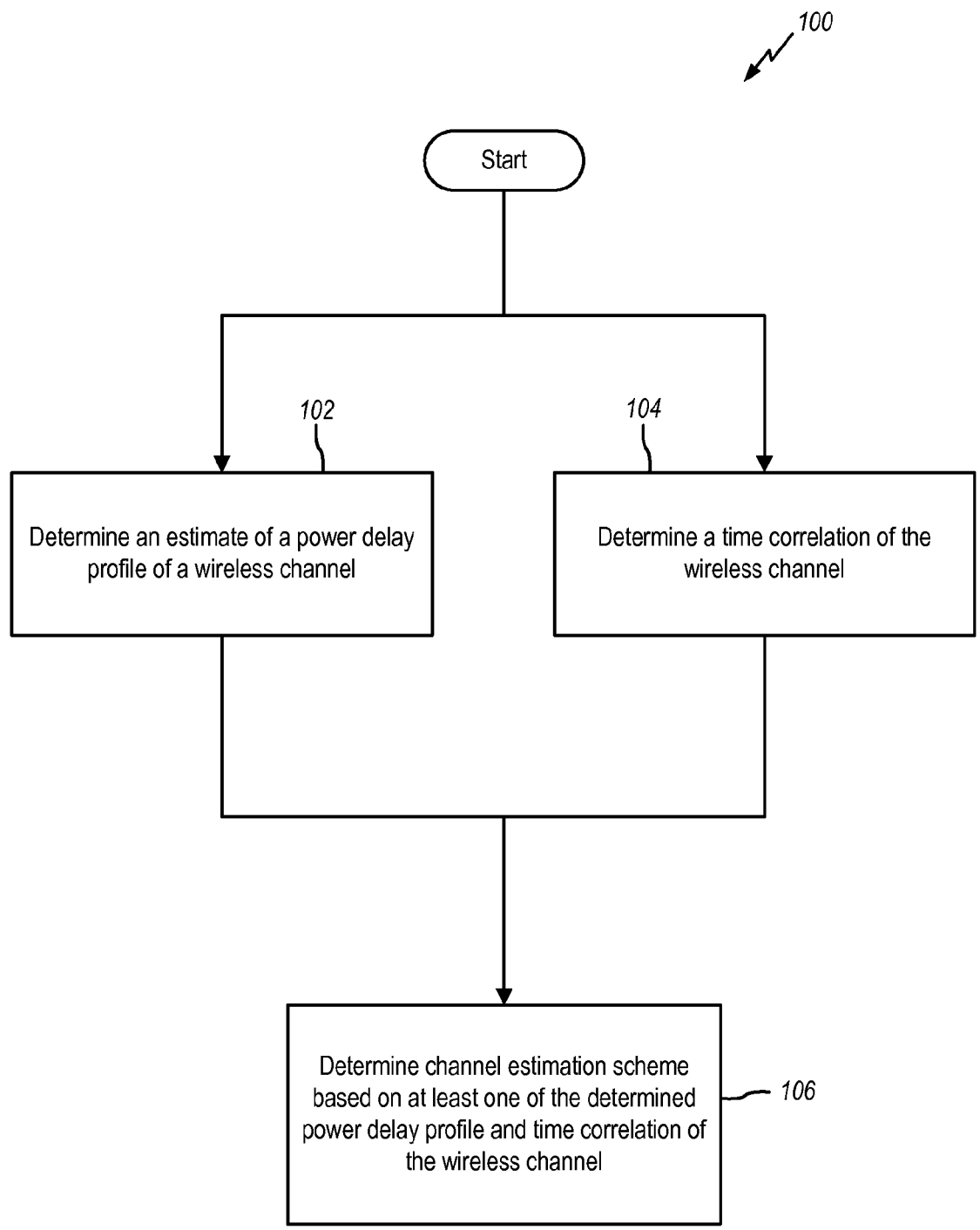
FIG. 1A is flow diagram of an exemplary method for adapting channel estimation scheme in a receiver in a communication system.

Accordingly, the present disclosure relates to methods and apparatus that adapt or optimize selection of a channel estimation scheme in a transceiver that accounts for the speed or Doppler of the transceiver. In particular, selection of the channel estimation scheme may be based on the time-correlation of a channel to account for the speed or Doppler. Additionally, the power delay profile of the channel is also accounted for in determining the best channel estimation scheme, since the power of the channel also affects which channel estimation will be optimal. Thus, according to an aspect, FIG. 1A illustrates a methodology 100 for adapting or selecting a channel estimation scheme from a plurality of channel estimation schemes. As illustrated, method 100 includes block 102 where an estimate of a power delay profile of a wireless channel is determined The power delay profile may be determined by either measuring the channel energy of the channel in each bin or calculating or estimating the power delay profile using various methods, which will be discussed more fully below.

Method 100 also includes a block 104 in parallel with block 102 where a time correlation of the wireless channel is determined, which affords an accounting for the speed (Doppler) of the transceiver. The determination of the time correlation may be made by measuring the time correlation of the wireless channel (i.e., measure the Doppler correlation coefficients). The measurement may, for example, include considering differences between channel estimates of two sequentially occurring symbols. As a more specific example, in a system having frames with a fixed pilot pattern such as 2, 2, 2 . . . , the time correlation may be estimated by looking differences between two consecutive symbols since the same known pilot symbol occurs in each symbols and time differences in the channel estimate may be determined by looking at consecutive channel estimates.

In another particular example of a system with a general pilot pattern such as 0, 3, 6, 1, 4, 7, 2, 5, 0, a time correlation may be determined looking at the difference between channel estimates between channel estimates separated by 8 symbols (i.e., those symbols having the same pilot symbol interlace slot) to determine a time correlation (i.e., Doppler) estimation.

After the determinations of the power delay profile and time correlations are made, flow proceeds to block 106 where a channel estimation scheme is then determined based on at least one of the determined power delay profile and time correlation of the wireless channel. Thus, in this way the channel estimation is adapted based on conditions affecting the channel such as varying power delay profile or time correlation (e.g., high Doppler conditions).

Figure 1B:
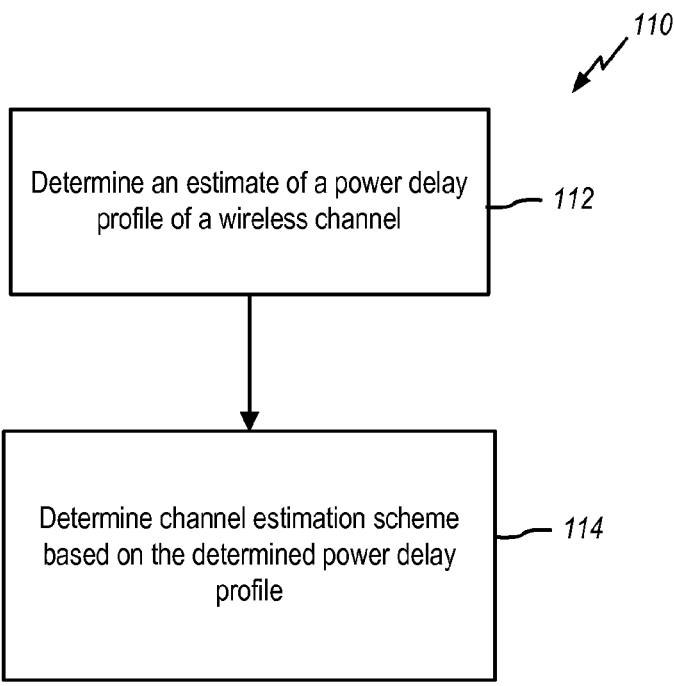
FIG. 1B is flow diagram of another exemplary method for adapting a channel estimation scheme in a receiver in a communication system.

According to another aspect, the channel estimation adaptation method of FIG. 1A may be modified such that merely at least one of the determinations of blocks 102 or 104 need be made. For example, FIG. 1B illustrates one such method 110 that may be used for adapting a channel estimation scheme in a communication system. Method 110 includes block 112 where an estimate of a power delay profile of a wireless channel is determined. After determination of the power delay profile, flow proceeds to block 114 where a channel estimation scheme is then determined based on the determined power delay profile.

Figure 1C:
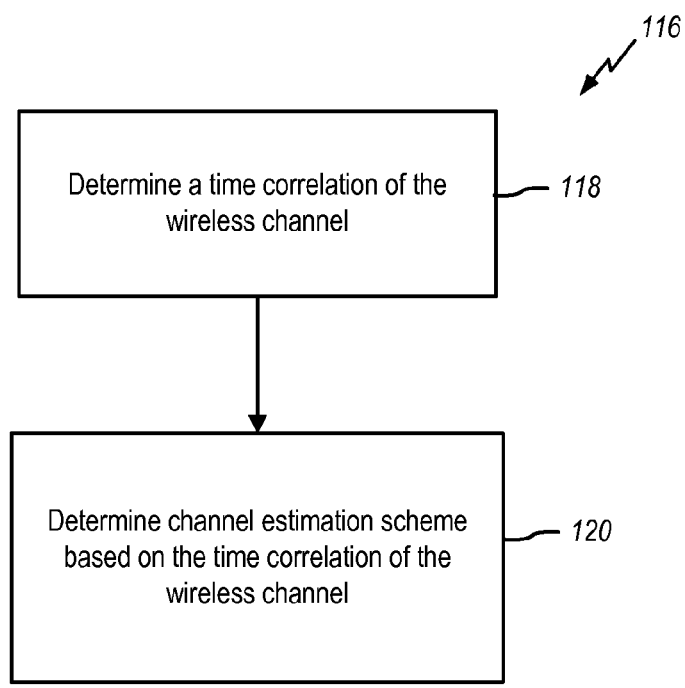
FIG. 1C is flow diagram of yet another exemplary method for adapting a channel estimation scheme in a receiver in a communication system.

FIG. 1C illustrates another method 116 that may be used for adapting a channel estimation scheme in a communication system. Method 116 includes block 118 where a time correlation of the wireless channel is determined. The time correlation is affected by the speed of the receiver. Thus, the time correlation, in one example, may be based on or measured by a determined Doppler correlation coefficient, which will be discussed more fully later. After determination of the time correlation, flow proceeds to block 120 where a channel estimation scheme is then determined based on the determined power delay profile. It is noted that the adaptation or selection of the channel estimation schemes shown in FIGS. 1A-1C may be effected by any of a number of methods and apparatus, examples of which are disclosed later herein.

Figure 2:
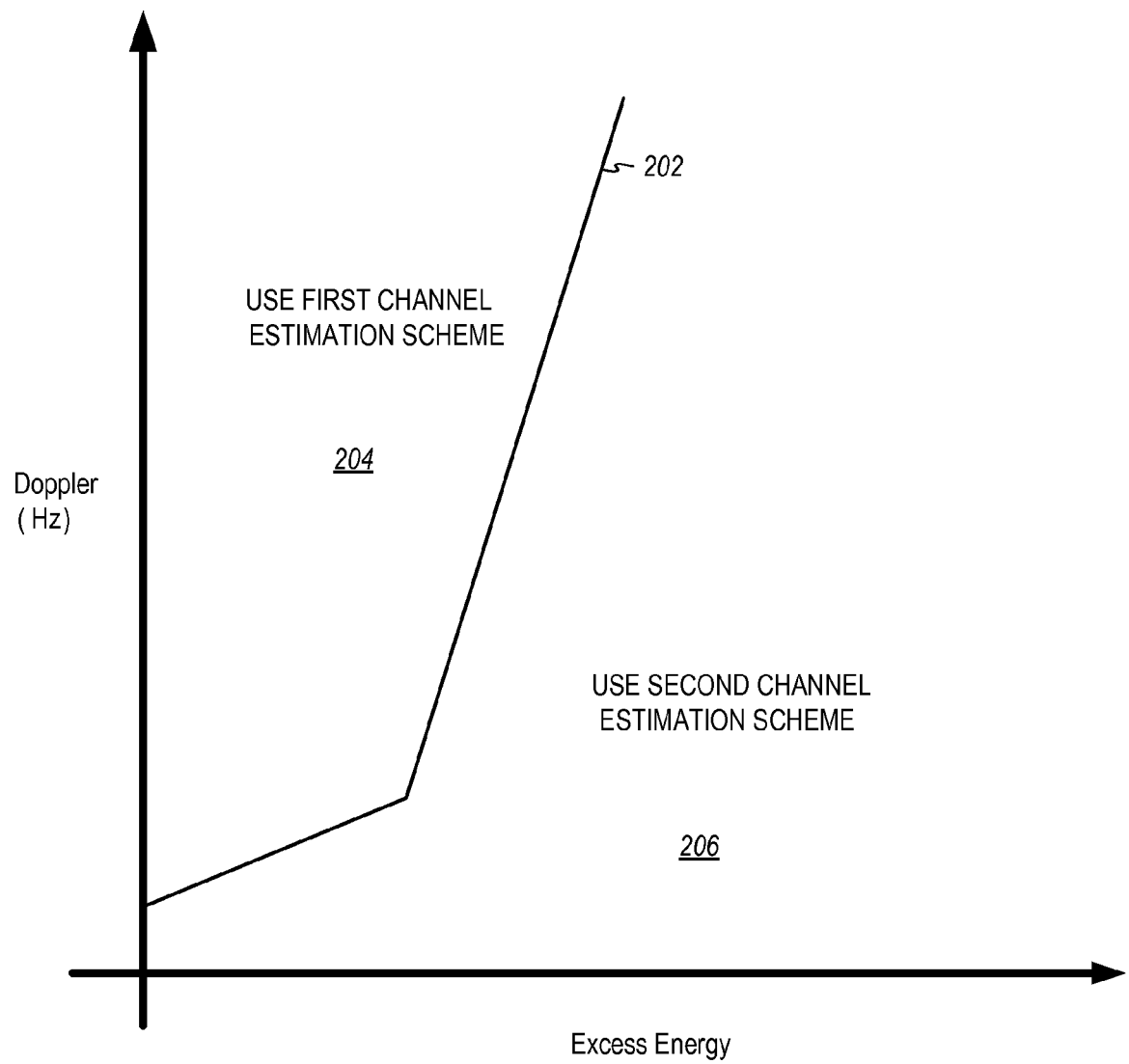
FIG. 2 illustrates an exemplary plot of a metric used in selecting a channel estimation scheme with a method for determining an optimal channel estimation scheme.

In one example, the adaptation or selection of a channel estimation scheme may be based on a predetermined decision metric correlating the measured Doppler and an excess energy component of the power delay profile. It is noted that the excess energy is that energy longer than the pilot observation in one OFDM symbol. FIG. 2 illustrates an exemplary plot of a metric that may be used in selecting a channel estimation scheme with a method for determining an optimal channel estimation scheme. As shown in FIG. 2, a metric function 202 serves as a division between those values of the Doppler and excess energy warranting a first channel estimation scheme 904 and those warranting a second channel estimation scheme 906. It is noted that FIG. 2 is only one example. Other, more complex decision metrics are also contemplated where various excess energy taps are considered and the number of channel estimation schemes that may be selected from is greater than two.

In another example of the methods of FIG. 1A, 1B, or 1C, it is noted that a quantitative approach may be utilized to determine an optimal channel estimation by defining cost functions based on the power delay profile and time correlation of a channel. Specifically, a minimum mean square error approach (MMSE) may be taken to determine which of a number of cost functions yields the lowest error, and thus presents the optimal channel estimation scheme.

Figure 3:
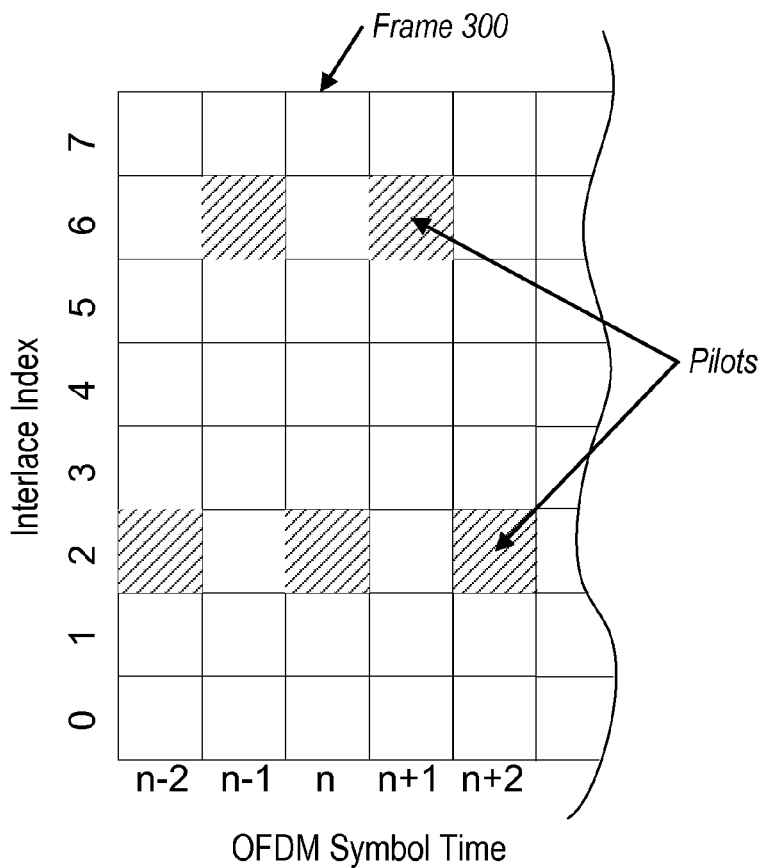
FIG. 3 illustrates an exemplary communication frame having a (2,6) pilot staggering arrangement.

For pedagogical purposes, it is noted that in particular OFDM systems, such as Forward Link Only (FLO) systems, the transmitted waveform may have 4000 active sub-carriers in an OFDM symbol, which are mapped to an interlace of sub-carrier groupings or slots within a transmitted frame structure. As an illustration, FIG. 3 illustrates a frame 300 having a number of OFDM symbols or symbol times (e.g., n−2, n−1, n, n+1, etc.). The sub-carrier frequencies or tones for each OFDM symbol are organized or mapped into an interlace of eight slots, each slot containing approximately one eighth of the total number of sub-carriers. It is noted that one of the eight interlaces may include uniformly spaced sub-carriers that are used as pilots for channel estimation. Additionally, in some systems the pilot interlace is varied from symbol to symbol to enable the receiver to estimate longer channel estimates, if necessary. Thus, in such systems the pilots are staggered in a pattern. In the example of FIG. 3, the pilot staggering pattern is a (2,6) pattern where the pilot are alternately staggered between interlace slots two and six from symbol to symbol.

Current implementations of FLO, as an example, support a pilot staggering pattern of (2,6) which supports the estimation of channels of length up to 1024 chips. At a FLO receiver, the pilot interlace is processed to obtain a time domain channel observation y(n) for every symbol. The number of pilot observations in a symbol is denoted by Np, which may be up to 512 chips in a FLO system with a (2,6) pilot pattern. For a (2,6) pilot pattern, in particular, it is assumed that the channel has a length less than $2N_p$ chips. Based on this assumption, the channel observation y at symbol n (assuming the pilot interlace slot is 6 for symbol n as shown in FIG. 1) can be written as:

$$y(n)=h_a(n)+jh_e(n)+w(n). \tag{1}$$

where $h_a(n)$ is a vector of the first $N_p$ taps of the channel at symbol n, $h_e(n)$ is a vector of the last $N_p$ taps of the channel at symbol n and w(n) is added white Gaussian noise (AWGN) with a variance $\sigma_w^2$ and may include an Inter Carrier Interference (ICI) floor.

It is further noted that channel observations at symbol times n−1 and n+1 (i.e., pilot interlaces 2) may be given as:

$$y(n-1) = h_a(n-1) - jh_e(n-1) + w(n-1)$$

$$y(n+1) = h_a(n+1) - jh_e(n+1) + w(n+1). \quad (2)$$

The time domain channel observations from multiple symbols (i.e., the channel observations y(n)) are then combined using a time filter to derive a channel estimate ($\hat{h}(n)$), which is then used for data demodulation. It is noted that selection of which particular time filter that is to be used to combine the channel observations to determine the channel estimate involves weighing between reducing the noise in the channel estimate (i.e., using a long time filter to mitigate the effects of noise), the amount of excess channel energy and gaining performance at high speeds (i.e., a quickly varying channel estimate or instantaneous channel estimate).

A further consideration in selecting the time filter is the target length of the channel estimate. It is evident that if the length of the channel estimate is known a priori to be greater than the number of pilot observations ($N_p$), then more than one pilot observation is required to completely determine the channel estimate. In FLO systems, for example, the target length of the channel estimate is set to be 1024 taps (i.e., $2N_p$), and therefore observations from multiple symbols need to be combined to determine the channel estimate, as mentioned above.

In order to achieve good performance for channel estimation even at higher speeds (i.e., high Doppler), a non-causal time filter is used in FLO systems, for example. In this example, two time filters are utilized that process the channel observations to determine the channel estimate for the first $N_p$ taps (Actual channel estimate) and the last $N_p$ taps (excess channel estimate). These filters are referred to as the Actual Time Filter (ATF) and the Excess Time Filter (ETF) and their coefficients are (¼, ½, ¼) and ±j(−¼, ½, −¼) respectively using the example of a (2,6) pilot patterned FLO system. Accordingly, for the particular case of these coefficients, it follows that the actual and excess channel estimates ($\hat{h}_a$ and $\hat{h}_e$, respectively) may be determined according to the following relationships:

$$\hat{h}_a(n-1) = \frac{y(n) + 2y(n-1) + y(n-2)}{4} \quad (3)$$

$$\hat{h}_e(n-1) = \pm \frac{-y(n) + 2y(n-1) - y(n-2)}{4j}$$

The actual and excess channel estimates thus obtained may be then thresholded to eliminate noisy taps prior to computing the frequency domain channel estimate.

According to an aspect, a simple criterion is disclosed herein for time filter selection. A time filter is selected to minimize the channel estimate error and thus optimize the channel estimate quality. In particular, a time filter is selected that yields a time domain channel estimate $\hat{h}(n)$ with a minimum Mean Square Error (MMSE) with respect to an ideal channel estimate h(n). Quantitatively, this may be realized as the minimization of the following expectation value E:

$$E(\|h(n) - \hat{h}(n)\|^2) \quad (4)$$

where h(n) may be a $2N_p \times 1$ long ideal channel estimate and $\hat{h}(n)$ is a $2N_p \times 1$ channel estimate from the time filters, such as the combination of the actual and excess channel estimates ($\hat{h}_a$ and $\hat{h}_e$, respectively) discussed above.

Since this is a Minimum Mean Square Error (MMSE) question, finding the MMSE filter (i.e., the optimal filter) requires solving Wiener-Hopf equations, which involves a matrix inversion. According to an aspect, from an implementation point of view it is not desirable to change the length of the non-causal time filter as this would necessitate buffering of extra data symbols. Therefore, a time filter may be then selected from a restricted sub-set of filters that has the minimum MSE. As an example, the time filters considered are: NTF with coefficients (0,1,0); PTF with coefficients (¼, ½, ¼) and (0,0,0); and TF with coefficients (¼, ½, ¼) and ±j(−¼, ½, −¼).

A cost function C may be determined for each of the different filters under consideration, to map or translate the efficaciousness of the filter to a quantitative measure that may be compared to determine the optimal filter. Taking the example of NTF, PTF, and TF filters above, a cost function for each filter may be determined. For purposes of this discussion, it is assumed that channel taps are assumed to be wide sense stationary and uncorrelated with each other. It is also assumed that the time variation of each of the channel taps is identical, and that noise on all taps of the channel observation is independent and identically distributed (i.i.d.). Based on these assumptions, the cost functions C for each of these filters can be calculated by evaluating the MSE as:

$$C(NTF) = 2P_{He} + N_p\sigma_w^2 \quad (5)$$

$$C(PTF) = P_H \frac{(3 - 4a_1 + a_2)}{8} + P_{He} + \frac{3}{8}N_p\sigma_w^2$$

$$C(TF) = P_H \frac{(3 - 4a_1 + a_2)}{4} + \frac{6}{8}N_p\sigma_w^2$$

where $$E[\|y(n)\|^2] = P_H + N_p\sigma_w^2$$

$$= P_{Ha} + P_{He} + N_p\sigma_w^2$$

$$P_{Ha} = E[\|h_a(n)\|^2]$$

$$P_{He} = E[\|h_e(n)\|^2].$$

In the above equations (5), $P_H$ denotes the total channel estimate energy, $P_{Ha}$ is the energy of actual channel estimate, and $P_{He}$ is the energy of the excess channel estimate. It is also noted that the noise variance per tap in the time domain channel observation y(n) is denoted by $\sigma_w^2$. Additionally, the cost functions in equations (5) further include time correlation (i.e., Doppler correlation) coefficients $a_1$ and $a_2$ affording a characterization of the time variation of the channel, assuming a pilot (2,6) staggering. It is noted here that additional Doppler correlation coefficients would be required for time filters of longer length. The time variation of the channel for pilot (2,6) staggering is characterized by time-correlation or Doppler correlation coefficients $a_1$ and $a_2$, which are given by the following relationships:

$$a_1 = \frac{E[h(n; m)h^*(n-1; m)]}{E[\|h(n; m)\|^2]} \quad (6)$$

$$a_2 = \frac{E[h(n; m)h^*(n-2; m)]}{E[\|h(n; m)\|^2]}$$

where m denotes the tap index of the $N_p$ taps for the actual and excess time filters.

It is noted that the cost functions given by equations (5) above have an intuitive interpretation and are derived as follows. For the NTF case, the error in the channel estimate is twice the excess energy as the excess taps get aliased to the wrong tap locations. In addition to this, the error due to the noise needs to be added, with the noise variance per tap being $\sigma_w^2$. For the TF case, there is no aliasing error as the time filter can resolve channel estimates up to $2 N_p$. However, there is a time variation error due to the averaging of channel estimates across symbols, which is proportional to the channel energy and to the rate of time variation. The contribution from noise is lower due to the averaging across multiple symbols. For the PTF case, the excess taps do not get aliased, but are not captured as there is no excess time filter. However, the absence of the excess time filter halves the time variation error and the noise variance.

It is further noted that the above discussion of the cost functions did not consider thresholding to remove noise presented by noisy taps for each time filter. It is noted that according to an aspect, modeling of thresholding may include the assumption that only noisy taps are removed, without affecting the channel energy. Additionally, thresholding can be assumed to not affect the time variation error. It is noted, however, that these assumptions are not strictly valid. In particular, the second assumption is not valid at low Doppler as thresholding can, in some instances, remove artifacts in the channel estimate. Thus, the cost functions calculated for the time filters are higher than the ideal value. Also note that the threshold for the no-time filter case should be set higher due to higher noise in the channel estimate.

Figure 4:
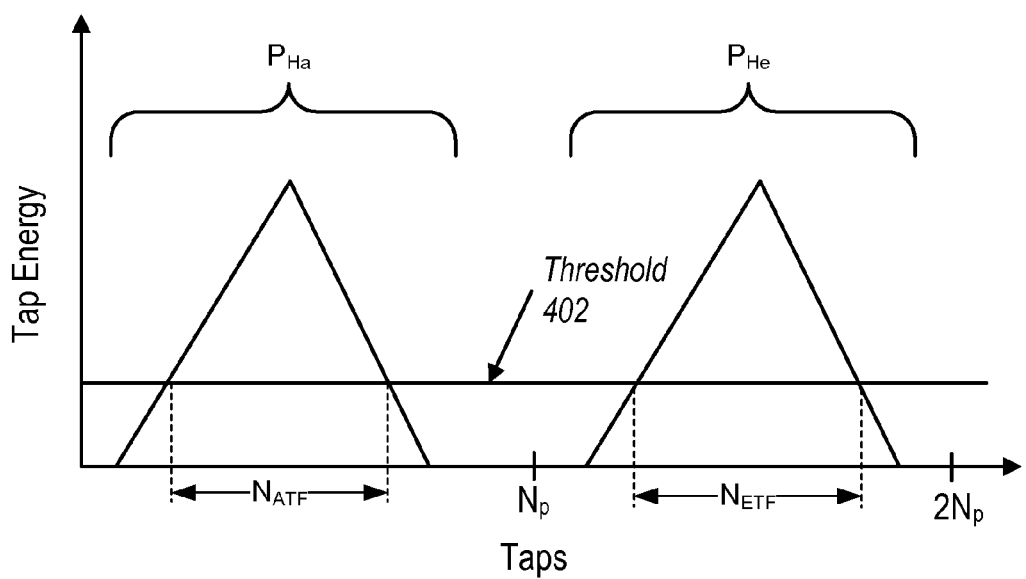
FIG. 4 is a plot of tap energy over a number of filter taps and illustration of thresholding to determine $N_{ATF}$ and $N_{ETF}$ values.

FIG. 4 illustrates an exemplary plot of the channel energy over a number of taps (e.g., 2Np taps). As may be seen in this plot, a threshold energy 402 is set. This threshold may be set according to the filter being considered, of which some have higher or lower noise in the channel estimate. As may also be seen, the channel energy over the first $N_p$ taps is the $P_{Ha}$ energy of the actual time filter and the channel energy over the next $N_p$ taps is the $P_{He}$ energy of the excess time filter. Moreover, it may be seen in FIG. 4 that a number $N_{ATF}$ of the first $N_p$ taps have energy levels above the threshold 402 and a number $N_{ETF}$ taps of the last Np taps are also above the threshold 402. Based on these number of taps above the threshold 200, the cost functions C given above in equations (5) for the NTF, PTF and TF filters may be then modified as follows:

$$C(NTF) = 2P_{He} + (N_{ATF} + N_{ETF})\sigma_w^2 \qquad (7)$$

$$C(PTF) = P_H \frac{(3 - 4a_1 + a_2)}{8} + P_{He} + \frac{3}{8}N_{ATF}\sigma_w^2$$

$$C(TF) = P_H \frac{(3 - 4a_1 + a_2)}{4} + \frac{3}{8}(N_{ATF} + N_{ETF})\sigma_w^2.$$

Thus, assuming thresholding, the cost functions for time filter selection are determined by the estimation of the following parameters or terms: $P_H$, $P_{He}$, a1, a2, $\sigma_w^2$, $N_{ATF}$, and $N_{ETF}$. The following discussion will present exemplary methodologies for computing or obtaining these parameters.

Concerning the estimation of noise variance ($\sigma_w^2$), according to an aspect the noise power can be estimated in certain receivers using a wide-area identifier WIC based carrier-to-interference (C/I) energy estimation and from other overhead symbol processing. It is noted that noise power can also be estimated from the time filtered channel estimate, but this estimate is less accurate if the location of the channel taps is not known. Regarding the estimation of the channel energy ($P_H$), this parameter may be derived or calculated from knowledge of the estimated noise power and a set point (P0) of the Automatic Gain Control (AGC) in a receiver.

In an aspect, Doppler correlation coefficient $a_2$ may be estimated straightforwardly assuming the use of (2,6) pilot patterns. This is because the channel observations separated by 2 symbols are identical, except for time variations and noise. Thus the expectation E of the channel observation separated by two symbols can be give as:

$$E[y^H(n)y(n-2)] = a_2 P_H. \qquad (8)$$

However, an estimate of $a_2$ can be obtained from energy measurements on the actual and excess time filter outputs, prior to thresholding. The average total power at the output of the actual and excess time filters can be given by:

$$P_1 = \frac{P_{Ha}(3 + 4a_1 + a_2) + P_{He}(3 - 4a_1 + a_2)}{8} + \frac{3}{8}N_p\sigma_w^2 \qquad (9)$$

$$P_2 = \frac{P_{Ha}(3 - 4a_1 + a_2) + P_{He}(3 + 4a_1 + a_2)}{8} + \frac{3}{8}N_p\sigma_w^2.$$

Correlation coefficient or parameter $a_2$ can then be estimated as follows:

$$\hat{a}_2 = 3 \frac{4/3(P_1 + P_2) - P_0}{P_0 - N_p\sigma_w^2} \qquad (10)$$

$$\hat{a}_2 = \min(1, \hat{a}_2)$$

As, $$P_1 + P_2 = \frac{3 + a_2}{4} P_H + \frac{3}{4}N_p\sigma_w^2$$

and $$P_0 = P_H + N_p\sigma_w^2$$

Figure 5:
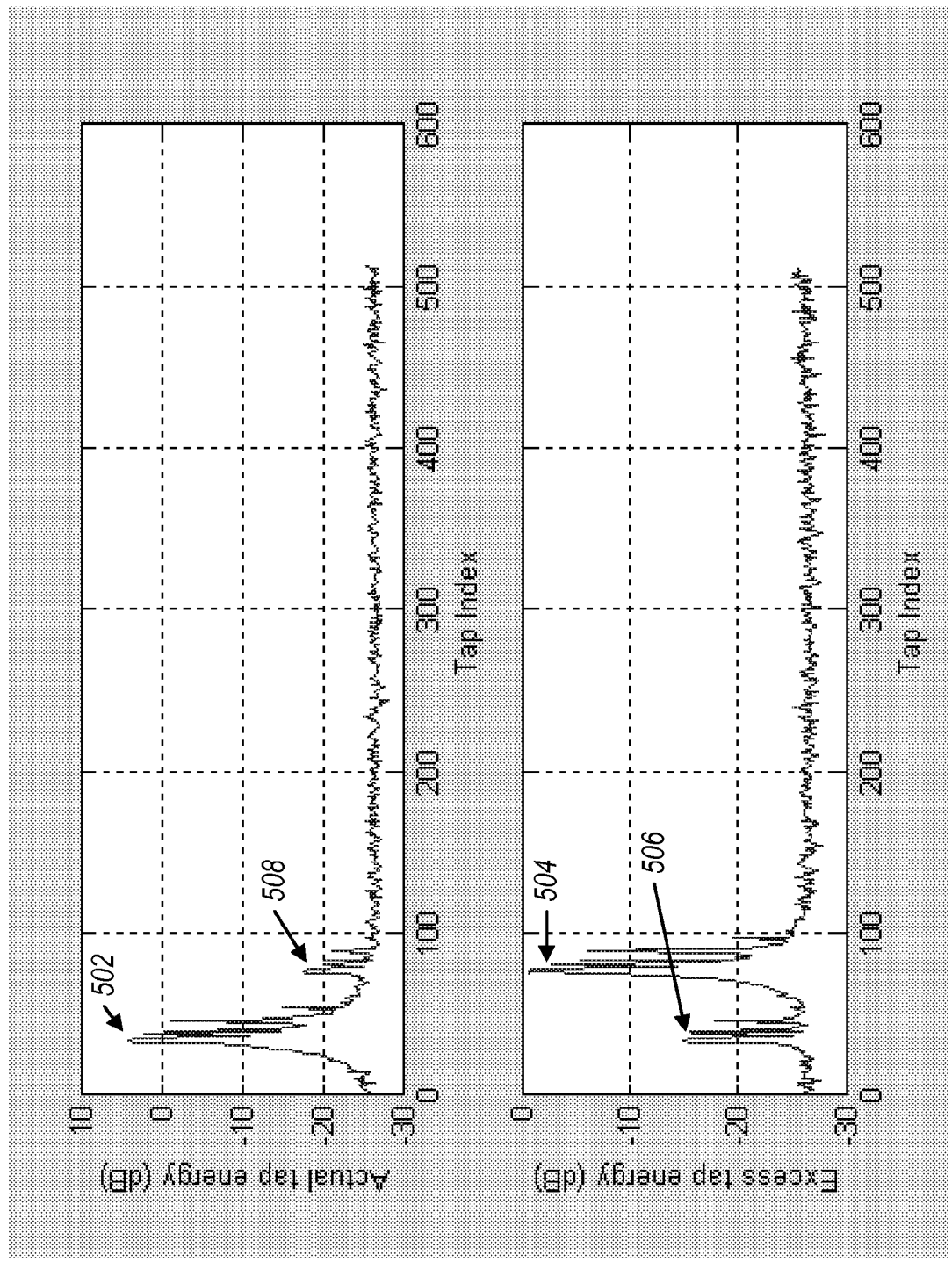
FIG. 5 shows graphs of an example of actual tap and excess tap energy of actual and excess time filters with respect to the tap index for an exemplary channel.

Estimation of Doppler correlation coefficient $a_1$ is complicated by the fact that successive symbols (e.g., n, n+1) have pilots in different interlaces (e.g., 2 and 6), and, therefore, the excess channel aliases differently in succeeding symbols. However, the sparseness of the channel estimate can be exploited in developing an estimator for a1. At each tap location, the actual and excess time filter output energies can be written as follows:

$$E(|z_1(n; m)|^2) = \frac{\sigma_a^2(m)(3 + 4a_1 + a_2) + \sigma_e^2(m)(3 - 4a_1 + a_2)}{8} + \frac{3}{8}\sigma_w^2 \qquad (11)$$

$$E(|z_2(n; m)|^2) = \frac{\sigma_a^2(m)(3 - 4a_1 + a_2) + \sigma_e^2(m)(3 + 4a_1 + a_2)}{8} + \frac{3}{8}\sigma_w^2$$

where, $z_1(n;m)$ and $z_2(n;m)$ denote the output of the actual and excess time filters at symbol n for a tap m. It is noted that at each tap location, the actual time filter output contains a dominant term due to the channel tap at that location and an error term due to an excess channel tap at the same location, with the power of the error term increasing with increasing Doppler. Since channels are typically sparse with only a few taps, it is possible to find tap locations that do not contain both actual and excess channel energy. As an illustration, FIG. 5 shows graphs of the actual tap and excess tap energy of the ATF and ETF for an example) channel with respect to the tap index. In this particular example, the speed of the receiver is assumed to be 240 km/hr. As can be seen, tap locations around 40 correspond to actual channel taps (shown at arrow 502)

and tap locations around 90 correspond to excess channel taps (shown at arrow 504). The Doppler alias caused due to the time variation of the channel can also be seen clearly as the bump in energy around tap 40 in the excess time filter (shown at arrow 506) and around tap 90 in the actual time filter (shown at arrow 508).

In light of the above, an estimator for Doppler correlation coefficient $a_1$ can be developed by first identifying taps that contain either actual or excess channel energy, but not both. This can be accomplished by applying the following conditions. First, calculate the maximum $e_1(n)$ and minimum $e_2(n)$ of the actual and excess time filter output energy at each tap location m as quantified by the following relationships:

$$e_1(n) = \max(|z_1(n;m)|^2, |z_2(n;m)|^2)$$

and $$e_2(n) = \min(|z_1(n;m)|^2, |z_2(n;m)|^2) \qquad (12)$$

Next, only consider those tap locations meeting the conditions $e_1(n) > Th_1$ and $e_2(n) < Th_2$. Th1 and Th2 represent predetermined threshold constants.

The maximum and minimum energies satisfying the conditions above may then be summed or accumulated, such as by respective accumulators (termed herein as S1 and S2). Additionally, the number of accumulated taps that have been considered is also stored by an accumulator (termed herein as L). Mathematically, the accumulation of the maximum and minimum energies may be expressed as follows:

$$S_1 = \Sigma e_1(n)$$

$$S_2 = \Sigma e_2(n) \qquad (13)$$

It is noted that these accumulated values may then be equated to the average total power of the actual and excess time filters (see equations (9) above) as follows:

$$S_1 = \frac{3 + 4a_1 + a_2}{8} P + L \frac{3}{8} \sigma_w^2 \qquad (14)$$

$$S_2 = \frac{3 - 4a_1 + a_2}{8} P + L \frac{3}{8} \sigma_w^2$$

From $S_1$, $S_2$, L and $\hat{a}_2$, the value of Doppler correlation coefficient $a_1$ may then be calculated according to the following relationships:

$$\hat{a}_1 = \left(\frac{3 + \hat{a}_2}{4}\right) \frac{S_1 - S_2}{S_1 + S_2 - L\frac{3}{4}\sigma_w^2} \qquad (15)$$

$$\hat{a}_1 = \min(1, \hat{a}_1)$$

$$\hat{a}_1 = \max\left(\frac{1 + \hat{a}_2}{2}, \hat{a}_1\right)$$

Concerning the estimation of the excess channel energy ($P_{He}$), once $a_1$ and $a_2$ are known, the excess channel energy can be determined by solving the following equations:

$$P_H = P_{Ha} + P_{He} \qquad (16)$$

$$P_2 = \frac{P_{Ha}(3 - 4a_1 + a_2) + P_{He}(3 + 4a_1 + a_2)}{8} + \frac{3}{8} N_p \sigma_w^2$$

and then applying the condition $P_{He} = \max(0, P_{He})$.

In order to determine an estimation of the parameters $N_{ATF}$ and $N_{ETF}$, which are the number of ATF and ETF filter taps having an energy above a threshold (See e.g., FIG. 4): the number of actual and excess energy taps above the threshold may be counted directly in hardware, as an example, while the thresholding operation is performed. It is noted that a count may be performed through other means from hardware, such as software, firmware, or any combination thereof.

As stated above, once the parameters are determined, the various cost functions, such as those functions given above in equations (7) above, may be calculated. These cost functions thus server to determine or measure of a quality of the channel estimate for the various filters or channel estimation schemes. Moreover, by accounting for Doppler with coefficients $a_1$ and $a_2$, the measure of quality (or stated conversely, the measure of error) affords a better measure because of accounting for the speed of a transceiver. Selection of the particular time filter or channel estimation scheme may be accomplished or aided by then comparing the cost function results of the various functions, determining which has the lowest value, and then choosing the channel estimation scheme or time filter associated with that lowest value for performing channel estimation in the receiver.

According to an alternative aspect, some of the terms estimated for the cost functions may be estimated in a different manner utilizing dedicated pilots, such as Transitional Pilot Channel (TPC) symbols. In particular, in a receiver where either hardware or a processor (e.g., a DSP) perform time division multiplex pilot (TDM2) and TPC symbol processing (TDM2/TPM), the estimation of noise power can be estimated in certain OFDM receivers, such as those using wide area identifier (WIC) based estimation of the carrier to interference (C/I) ratio. From the estimated noise power, the channel estimate noise variance (i.e., $\sigma_w^2$) may be then determined.

In particular, the noise variance calculation for the TPC symbol proceeds by first utilizing either hardware or a DSP to calculate the energy of the TPC channel estimates $P_{Noise}(n)$ over a window of size $N_{win}$ according to the following relationship:

$$P_{Noise}(n) = \sum_{k=0}^{N_{Win}-1} |h_{TPC}(n+k)|^2 \qquad (17)$$

where $h_{TPC}$ is the channel impulse response of the TPC channel.

Over all possible window positions of the window $N_{win}$, the window position with minimum energy is then used to determine the noise variance $\sigma_w^2$. Accordingly, the minimum energy, which is denoted by $P_4$, is determined according to the following relationship:

$$P_4 = \min(P_{Noise}(n)) \qquad (18).$$

The channel estimate noise variance $\sigma_w^2$ is then obtained by first averaging the instantaneous estimates $P_4$ as follows:

$$\overline{P}_4(u) = (1-\alpha)\overline{P}_4(u-1) + \alpha P_4(u) \qquad (19)$$

where $P_4(u)$ represents current estimate, $\overline{P}_4(u-1)$ an immediately preceding averaged estimate, and $\alpha$ is a weighting factor. The averaged result $\overline{P}_4$ is then scaled according to following relationship:

$$\sigma_w^2 = \frac{P_4}{\text{Scaling Factor}} \quad (20)$$

where the scaling factor is a predetermined value to scale the factor by a desired value. An instantaneous estimate of the excess energy $P_{He}$ can be estimated in a straightforward manner by computing the energy of the TPC channel estimate over the excess taps and subtracting the contribution due to the noise. Thus, an excess channel energy estimate, denoted as $P_{He,1}$, may be first determined as follows:

$$P_{He,1} = \sum_{n=N_p}^{2N_p-1} |h_{TPC}(n)|^2 - \frac{P_4}{\text{ScaleFactor}} \quad (21)$$

$$P_{He,1} = \max(P_{He,1}, 0)]$$

where the square of the magnitude of channel impulse response $h_{TPC}$ of the TPC channel is summed over the range from excess taps $N_p$ to $2N_{p-1}$ (See e.g., FIG. 2).

The instantaneous estimates may then be averaged using an IIR filter to obtain the following estimates:

$$P_{He,2} = (1-\alpha)P_{He,2} + \alpha P_{He,1} \quad (22).$$

$P_{He}$ may then be obtained from the short term and long term averages as follows.

$$P_{He} = \max(P_{He,1}, P_{He,2}) \quad (23)$$

Similar to above, other parameters used for the cost functions may be estimated from channel estimate observations. According to an aspect, the numbers of actual and excess energy taps ($N_{ATF}$ and $N_{ETF}$) above the threshold are counted directly in hardware while the thresholding operation is performed. The estimates obtained are averaged to determine the average number of taps above the threshold according to the following relationships:

$$\overline{N}_{ATF}(u) = (1-\alpha)\overline{N}_{ATF}(u-1) + \alpha N_{ATF}(u)$$

$$\overline{N}_{ETF}(u) = (1-\alpha)\overline{N}_{ETF}(u-1) + \alpha N_{ETF}(u) \quad (24).$$

According to yet another aspect, the time filter powers $P_1$ and $P_2$ may be determined from time filter outputs. In order to obtain the average power at the time filter outputs the following operations may be performed as given by:

$$\overline{P}_1(u) = (1-\alpha)\overline{P}_1(u-1) + \alpha P_1(u)$$

$$\overline{P}_2(u) = (1-\alpha)\overline{P}_2(u-1) + \alpha P_2(u) \quad (25)$$

where $P_1$ and $P_2$ are the instantaneous powers corresponding to a second Excess Time Filter (ETF-II, which is identical to the Actual Time Filter (ATF)) and a first Excess Time Filter ETF-I, respectively.

Furthermore, an estimation of the channel energy $P_H$ may be calculated based on knowledge of the noise power and the AGC set point ($P_0$). In particular, the channel energy can be calculated according to the following relationship:

$$\overline{P}_H(u) = P_0 - N_p \sigma_w^2 \quad (26)$$

where $N_p$ is the number of pilot observations in one OFDM symbol, $\sigma_w^2$ is the channel estimate noise variance per tap.

Similar to the discussion previously, the estimation of time correlation coefficient $a_2$ is straightforward for (2,6) pilot patterns as the channel observations separated by 2 symbols are identical, except for time variations and noise. Therefore, $E[y^H(n)y(n-2)] = a_2 P_H$. However, an estimate of $a_2$ can be obtained from energy measurements on the actual and excess time filter outputs, prior to thresholding. The average total power at the output of the actual and excess time filters can be shown to be:

$$\overline{P}_1 = \frac{P_{Ha}(3 + 4a_1 + a_2) + P_{He}(3 - 4a_1 + a_2)}{8} + \frac{3}{8}N_p\sigma_w^2 \quad (27)$$

$$\overline{P}_2 = \frac{P_{Ha}(3 - 4a_1 + a_2) + P_{He}(3 + 4a_1 + a_2)}{8} + \frac{3}{8}N_p\sigma_w^2$$

An estimate of $a_2$ using the averaged estimates $\overline{P}_1$ and $\overline{P}_2$ from equations (27) for the time filter output power and the noise variance are then calculated according to the following equations (which are similar to equations (10) above):

$$\hat{a}_2 = 3\frac{4/3(\overline{P}_1 + \overline{P}_2) - P_0}{P_0 - N_p\sigma_w^2} \quad (28)$$

$$\hat{a}_2 = \min(1, \hat{a}_2)$$

As, $$\overline{P}_1 + \overline{P}_2 = \frac{3 + a_2}{4}\overline{P}_H + \frac{3}{4}N_p\sigma_w^2$$

$$P_0 = \overline{P}_H + N_p\sigma_w^2$$

The other time correlation (Doppler) coefficient $a_1$ may be easily estimated once the excess energy is determined. Thus, $a_1$ can be estimated as follows by first recognizing the following relationships about the relationship of $a_1$ to the channel power:

$$\overline{P}_1 - \overline{P}_2 = a_1(\overline{P}_{Ha} - \overline{P}_{He})$$

$$\overline{P}_H = \overline{P}_{Ha} + \overline{P}_{He} \quad (29)$$

Accordingly, $a_1$ may be determined as follows:

$$\hat{a}_1 = \frac{\overline{P}_1 - \overline{P}_2}{\overline{P}_H - 2\overline{P}_{He,1}} \quad (30)$$

$$\hat{a}_1 = \min(1, \hat{a}_1)$$

$$\hat{a}_1 = \max\left(\frac{1 + \hat{a}_2}{2}, \hat{a}_1\right).$$

Figure 6:
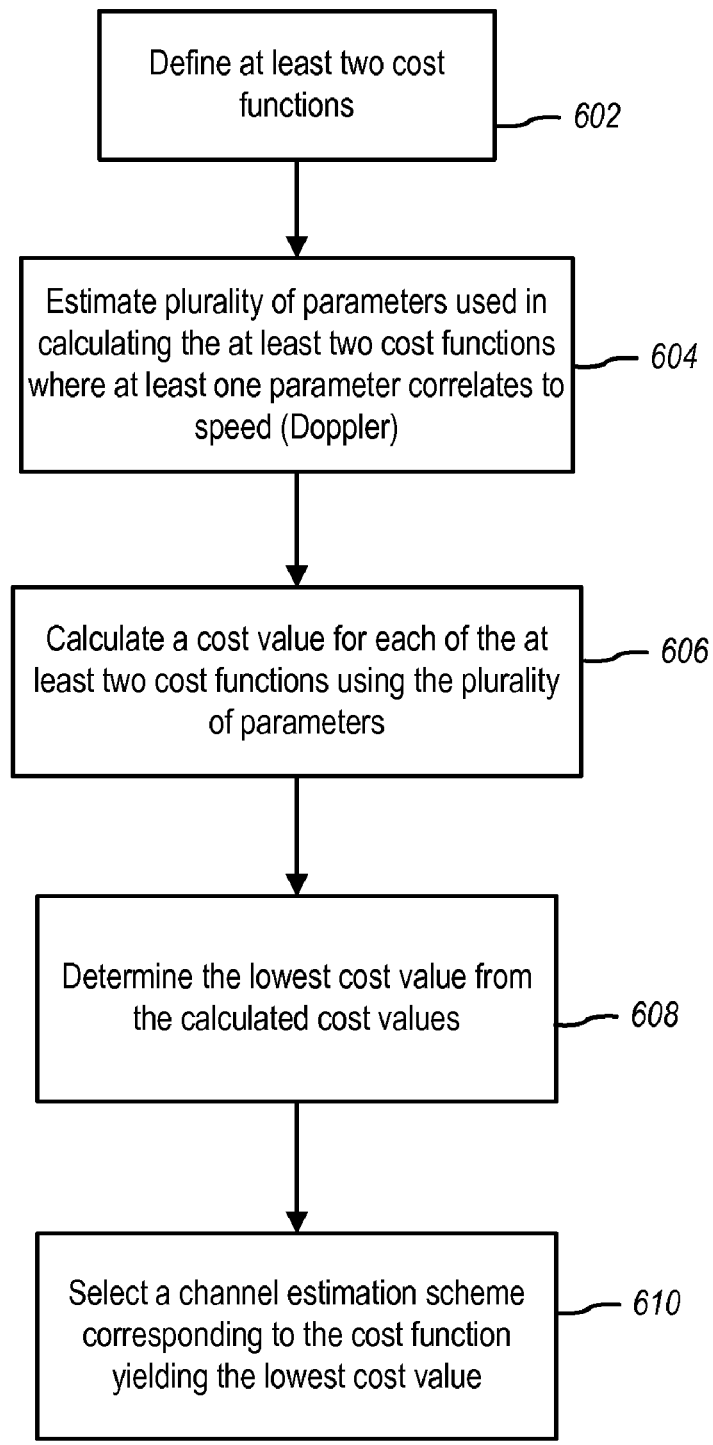
FIG. 6 illustrates a flow diagram of a method for determining an adaptive channel estimation scheme in a receiver in a communication system.

FIG. 6 illustrates a flow diagram of a further method for determining an optimal channel estimation scheme in a receiver in a communication system. The method of FIG. 6 may be thought of as a particular implementation of the method of FIG. 1, where various cost functions and parameter calculations achieve the processes of FIG. 1. As shown in FIG. 6, a first block 602 includes the operation of defining at least two cost functions C corresponding to respective channel estimation schemes or time filters. As examples of defined cost functions, equations (5) and (7) discussed above are illustrative. After the cost functions are determined in block 602, a plurality of parameters to be used in calculating each of the at least two cost functions are then estimated as illustrated by block 604. It is further noted that at least one of the plurality of parameters is a correlation parameter that correlates to a speed of the receiver. As an example for a (2,6) pilot staggering pattern, the parameters may include $P_H$, $P_{He}$, $a_1$, $a_2$, $\sigma_w^2$, $N_{ATF}$, and $N_{ETF}$, which may be determined according to the methods discussed above. The Doppler correlation parameters $a_1$, $a_2$ correlate to the Doppler or speed of the receiver.

After the parameters are determined at block 604, the attendant cost values resultant from calculation of the at least two cost functions using the parameters are then determined or calculated as illustrated by block 606. The lowest or minimum cost value from the values calculated in block 606 is determined as indicated by block 608. After determining the cost function that yields the lowest value or, in other words error, a channel estimation scheme or time filter corresponding to the cost function yielding the lowest cost value is then selected for channel estimation of a current symbol or symbols being demodulated.

While, for purposes of simplicity of explanation, the methodology in FIG. 6 is shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Figure 7:
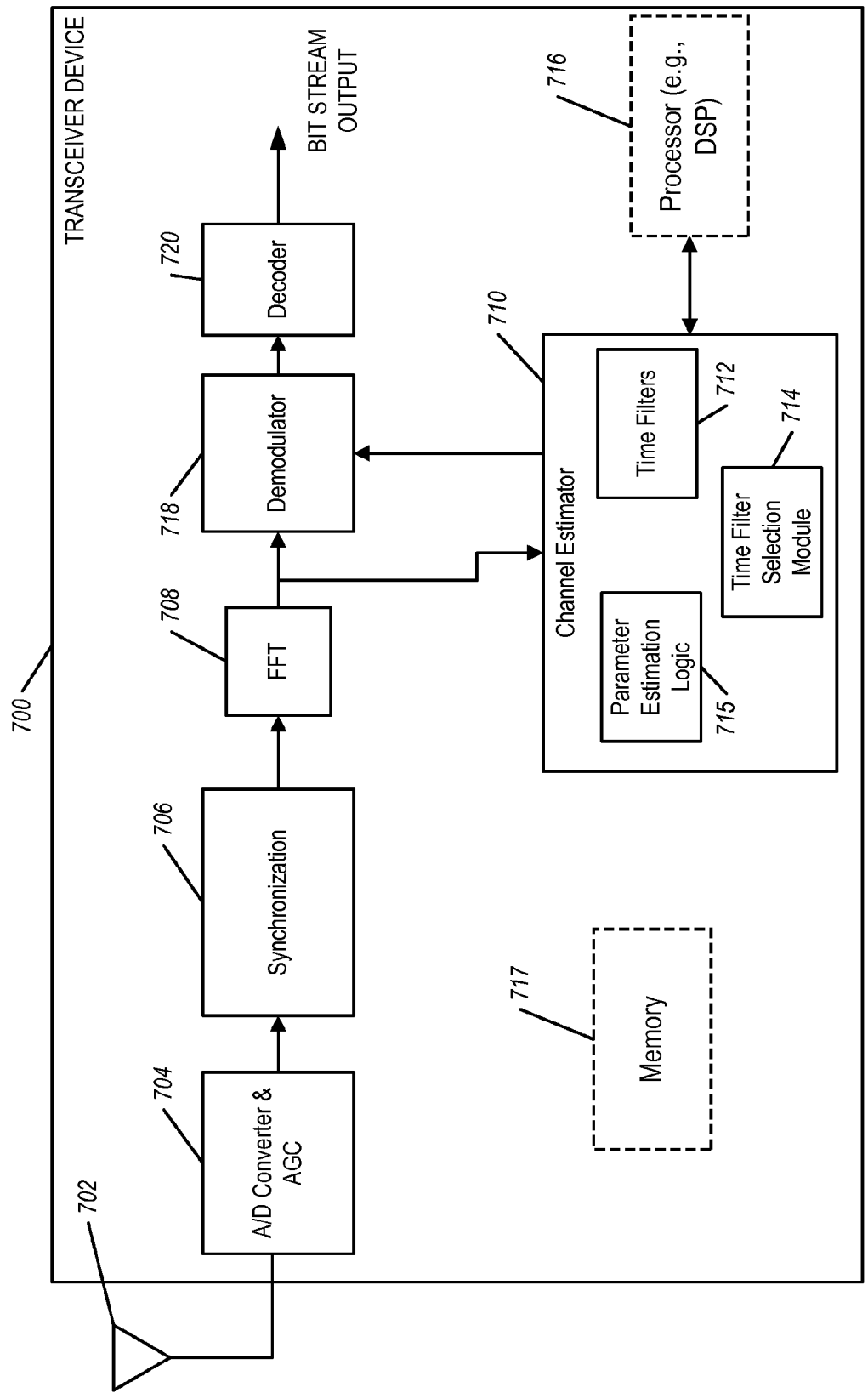
FIG. 7 is a block diagram of an exemplary transceiver that may employ apparatus configured to effect the methodology of FIG. 4.

FIG. 7 is a block diagram of an exemplary transceiver 700 that may employ apparatus to effect the above-described methodology for optimizing channel estimation in high Doppler environments. As illustrated, the transceiver 700 includes an antenna 702 to receive a transmitted wireless signal. The antenna 702 delivers the signal to an analog-to-digital (A/D) converter and Automatic Gain Control (AGC) 704 that converts the analog wireless signal to a digital signal and controls the gain of the signal to be delivered to a synchronizer 706 or similarly suitable device.

Synchronizer 706 establishes a timing window for sampling the subcarriers within the digital signal from block 704 with the correct synchronization or timing. The output of the synchronizer 706, which is a synchronized digital signal. This synchronized digital signal is input to a Fast Fourier Transform (FFT) 708 for transformation of the signal from frequency domain to time domain.

In the illustrated example of FIG. 5, the time domain signal output from the FFT 708 may be input to a channel estimator 710 for channel estimation of the channel. The channel estimator 710 may include various functional modules or logic that effect the various methods and calculations described previously herein. For example, any of the various time filters discussed herein may be implemented or modeled by the channel estimator as indicated by the time filters module 712. Furthermore, channel estimator 710 may be configured to determine or select a channel estimation filter or scheme, such as through cost functions as discussed herein. Accordingly, channel estimator 710 includes a time filter selection module 714 that may effect selection of the optimal time filter or channel estimation scheme.

According to an aspect, the channel estimator may further include hardware, such as a parameter estimation logic 715, or communicate with such hardware. Logic 715 may be configured to perform estimation of one or more of the parameters utilized in the cost functions modeled by the channel estimator 710. As a particular example, logic 715 may be configured to determine Doppler correlation coefficient $a_1$, as will be further discussed later with respect to FIG. 8. It is also noted that the channel estimator 710 may effect the methods illustrated in FIGS. 1A-C, 2 and 6, as examples. Furthermore, channel estimator 710 may be implemented as a separate processor, with the assistance of a digital signal processor (DSP) 716 illustrated with dashed lines, or as part of a DSP such as DSP 716. Additionally, the instructions used by the channel estimator 710 or DSP 716 to execute the methods and calculations discussed herein may be stored in a memory device 717, also shown dashed.

As also shown in FIG. 7, the FFT 708 sends a time domain signal to a demodulator 718, which utilizes the channel estimation scheme determined by channel estimator 710 to properly demodulate the time domain signal. The demodulator 718, in turn, delivers the demodulated signals to a decoder 720. Decoder 720 decodes the information and outputs the resultant bit stream for use by the mobile communication device in which the transceiver is housed, such as a mobile phone device, access terminal, or user equipment, as examples.

Figure 8:
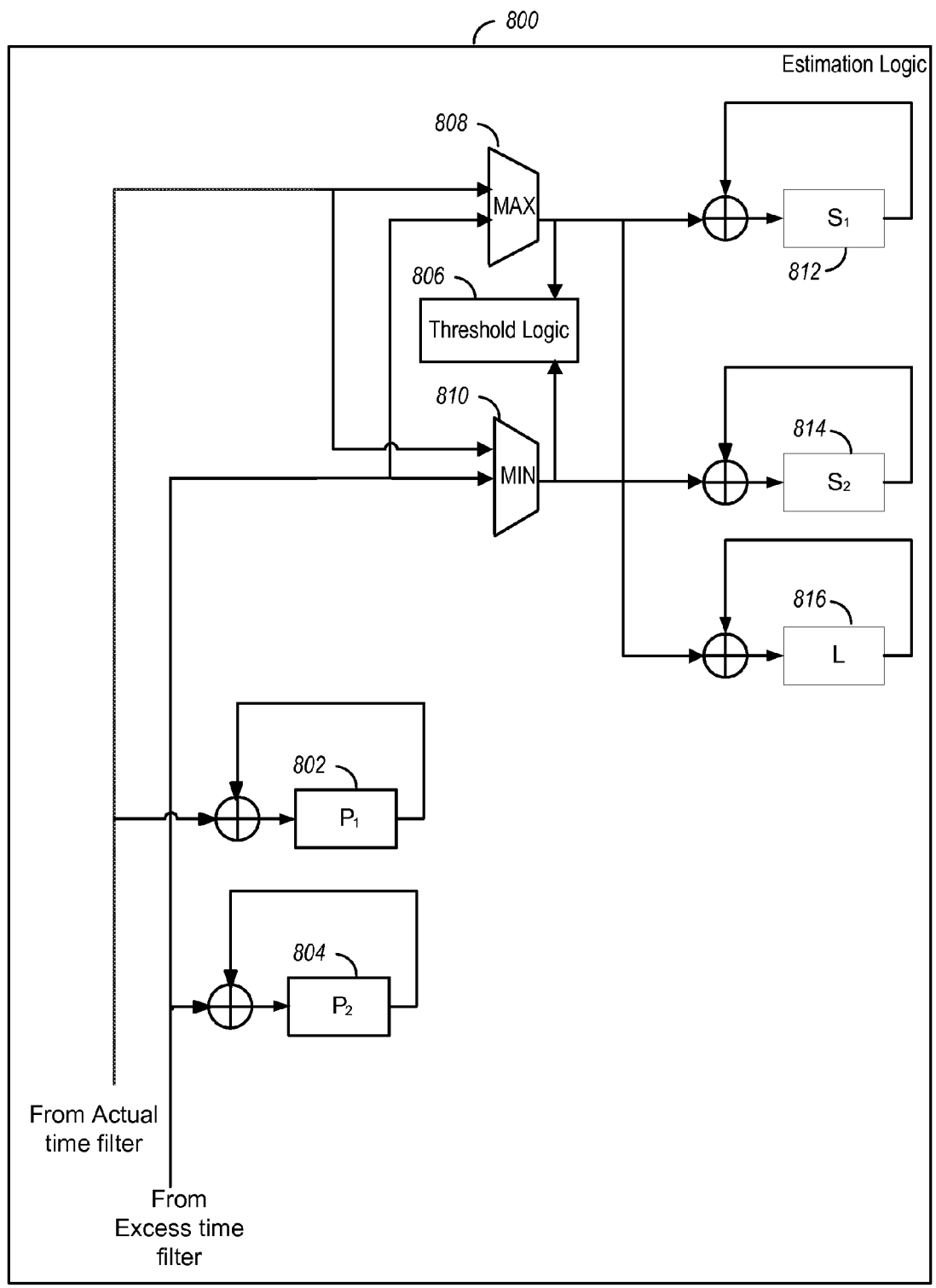
FIG. 8 illustrates an exemplary implementation of a hardware logic that may be implemented in or with the transceiver illustrated in FIG. 7 for estimation of a Doppler correlation coefficient.

FIG. 8 illustrates an exemplary implementation of a hardware logic 800 that may implemented in or with channel estimator 710 in FIG. 7 for estimating Doppler correlation coefficient $a_1$. As illustrated, estimation logic 800 shown below may be utilized to specifically assist in the estimation of Doppler correlation coefficient $a_1$ in the channel estimator or DSP for (2,6) pilot staggering patterns. For Doppler estimation, time filters, for the implementation of FIG. 8, are configured as follows: Actual Time Filter (ATF) having coefficient values (¼, ½, ¼), a first Excess Time Filter (ETF-I) having coefficient values (−¼, ½, ¼), and a second Excess Time Filter (ETF-II) having coefficient values ¼, ½, ¼). Note that ETF-II and ATF have the same coefficients. The outputs of ETF-I and ETF-II at tap position m on symbol n, for are given by the following relationships:

$$z_1(n;m) = \frac{y(n;m) + 2y(n-1;m) + y(n-2;m)}{4} \quad (ETF-II) \quad (31)$$

$$z_2(n;m) = \pm \frac{-y(n;m) + 2y(n-1;m) - y(n-2;m)}{4j} \quad (ETF-I)$$

Accordingly, the outputs given in equations (17) from the actual time filter (e.g., filter ETF-I) and excess time filter (e.g., ETF-II) are respectively first input to accumulators 802 and 804, which respectively sum the energies of all 256/512/1024 channel estimate taps accumulated every symbol to calculate the $P_1$ and $P_2$ values, discussed above, although these values may not be directly used for Doppler. In this particular implementation, the accumulation or summation of accumulators 802 and 804 may be quantified as follows:

$$P_1 = \Sigma |z_1(m;n)|^2$$

$$P_2 = \Sigma |z_2(m;n)|^2 \quad (32)$$

Logic 800 may also include threshold logic 806 that is used to determine a threshold value. Additionally, although not explicitly shown, logic 806 may include or be associated with counters for determining the number of taps above the threshold determined by logic 806 for the outputs of actual time filter and excess time filter.

The logic 800 also includes specific logic for estimation of Doppler correlation coefficient $a_1$. For each tap position, the power of actual time filter and excess time filter taps is compared so that the maximum value is generated at the output of a first comparator 808 and the minimum value is generated at the output of a second comparator 810. These values are then passed to two accumulators, $S_1$ 812 and $S_2$ 814, only if certain criteria are met, such as the conditions discussed above conditions where $e_1(n) > Th_1$ and $e_2(n) < Th_2$. Although not shown, the outputs of the comparators may be gated and controlled through assistance of logic 806 to ensure that only those tap values meeting the established criteria are passed to accumulators 812 and 814. Additionally, each tap passed to accumulators 812 and 814 may be counted by incrementing a register (L) 816 every time there is an update of either of the accumulators 812 and 814.

Figure 9:
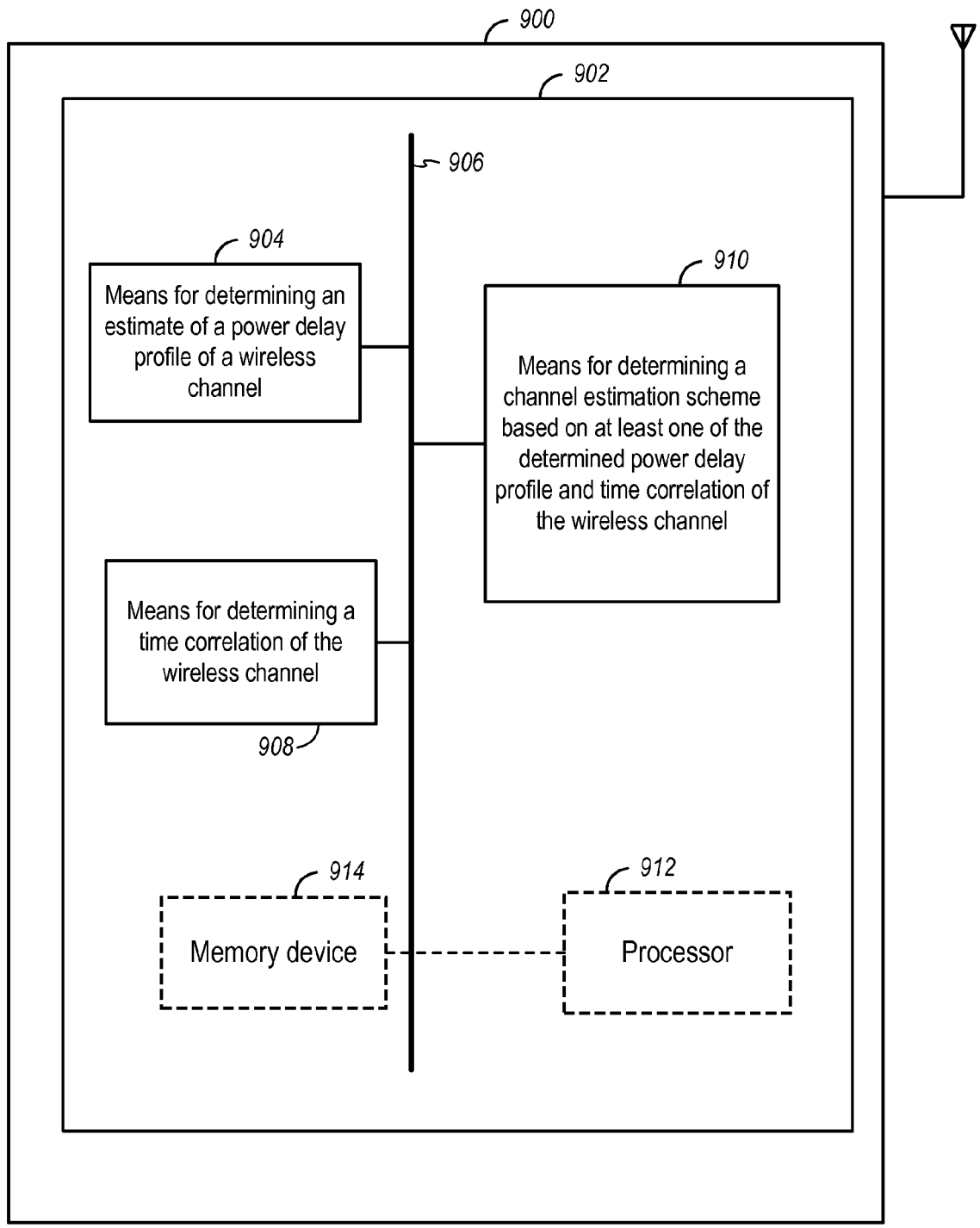
FIG. 9 is another block diagram of an apparatus that may be used to perform optimization of channel estimation.

FIG. 9 illustrates a block diagram of another apparatus 902 implementable in a transceiver 900 that may be used to perform optimization of channel estimation. The apparatus 902 may be implemented at least in part by a processor or similar device, or in conjunction with a processor. As illustrated, apparatus 902 includes a means 904 for determining an estimate of a power delay profile of a wireless channel. It is noted means 904 may be configured to employ any of various methodologies to estimate the power delay profile (i.e., either a calculated value or a measured value), such as were discussed above in connection with FIGS. 1-8. The power delay profile determined by means 904 may then be communicated to various other means or modules in apparatus 902 via a bus 906, or other similar suitable communication coupling.

Apparatus 902 also includes a means 908 for determining a time correlation of the wireless channel. Means 908 may be configured to determine the time correlation (Doppler) by measuring or by estimation of the Doppler correlation coefficients in accordance with the methods or apparatus discussed herein with respect to FIGS. 1-8. Apparatus 902 may employ both means 904 and 908 to implement a methodology as illustrated by FIG. 1A. In another aspect, one of either means 904 or 908 made be singularly employed to implement the respective methodologies of FIG. 1B or 1C, as examples.

Furthermore, a means 910 is included for determining a channel estimation scheme based on at least one of the determined power delay profile from means 904 and the determined time correlation of the wireless channel from means 908. If only means 904 is included in apparatus 902, means 910 only bases selection on the determined power delay profile, whereas if only means 908 is included, means 910 bases selection only on the determined time correlation of the wireless channel.

It is noted that apparatus 902 may, in an example, be implemented as channel estimator 710, DSP 716, or a combination thereof as illustrated in FIG. 7. Apparatus 902 may also include a processor 912 and associated memory storage 914 having computer executable instruction stored therein. Processor 912 is configured to execute the computer readable instructions in memory 914, and may be configured to execute one or more functions of the various means or modules in apparatus 902.

Figure 10:
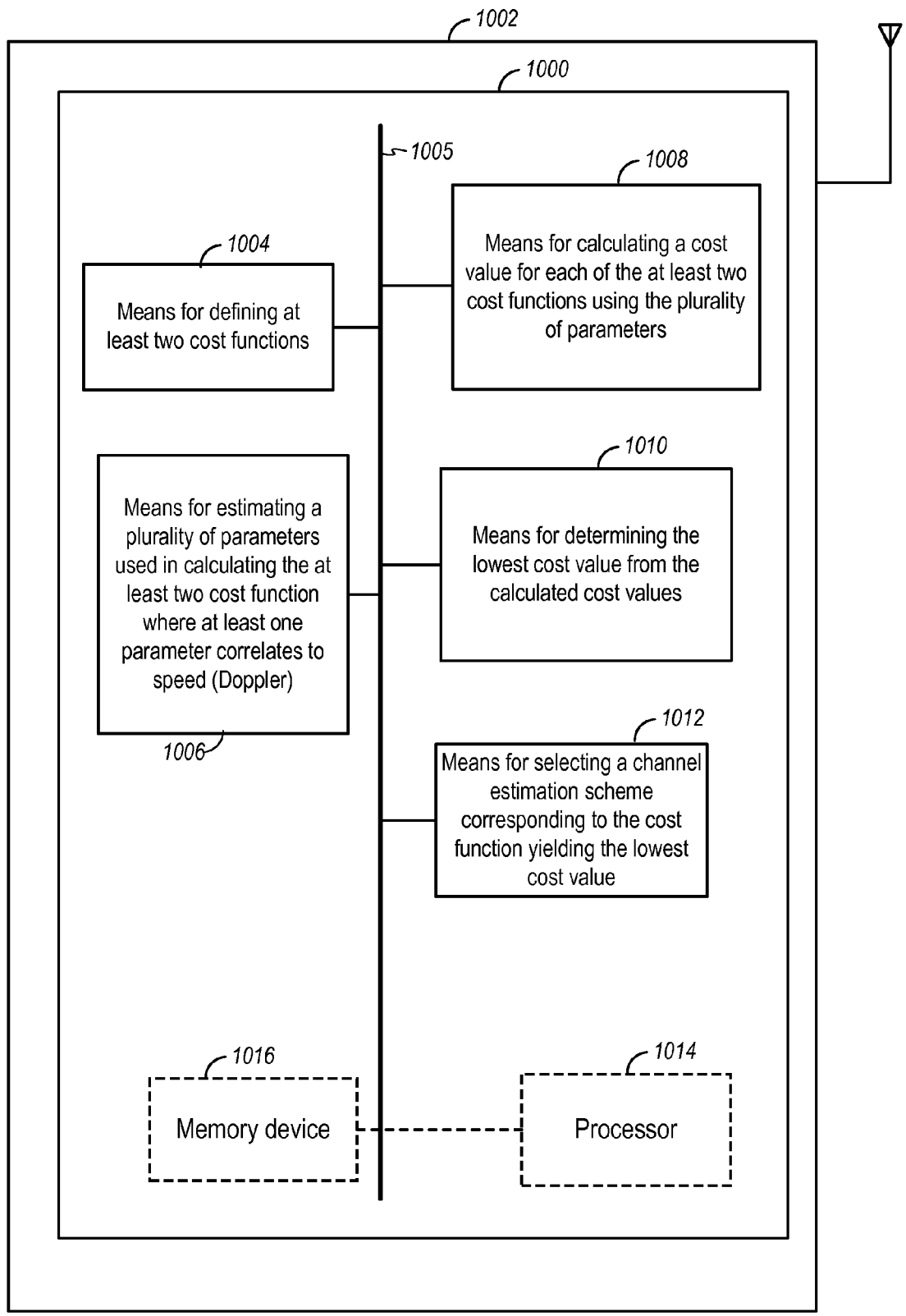
FIG. 10 is another block diagram of an apparatus that may be used to perform optimization of channel estimation.

FIG. 10 illustrates a block diagram of another apparatus 1000 implementable in a transceiver 1002 that may be used to perform optimization of channel estimation. The apparatus 1000 may be implemented at least in part by a processor or similar device, or in conjunction with a processor. It is also noted that the various modules illustrated in apparatus 1000 may be a separate device effecting the function of the various included modules, or alternatively apparatus 1000 may be included within apparatus 902 illustrated in FIG. 9, either as an augmentation or a substitution of one or more of the various modules therein.

As illustrated, apparatus 1000 includes a means 1004 for defining at least two cost functions. The cost functions defined by means 1004 may then be communicated to various other means in apparatus 1000 via a bus 1005, or other similar suitable communication coupling. In this case, the cost functions are communicated to a means 1006 for estimating a plurality of parameters used in calculating the at least two cost function where at least one parameter correlates to speed (Doppler). The parameters and methodologies to estimate the parameters that are implemented by means 1006 may include any of those discussed previously in connection with FIGS. 1-8.

Apparatus 1000 also includes a means 1008 for calculating a cost value for each of the at least two cost functions using the plurality of parameters. Furthermore, a means 1010 is included for determining the lowest cost value from the calculated cost values. Based on the determination by means 1010, a further means 1012 is included for selecting a channel estimation scheme corresponding to the cost function yielding the lowest cost value. It is noted that apparatus 1000 may, in an example, be implemented as channel estimator (e.g., see channel estimator 710 in FIG. 7), DSP (e.g., DSP 716 in FIG. 7), or a combination thereof. Apparatus 1000 may also include a processor 1014 and associated memory storage 1016 having computer executable instruction stored therein. Processor 1014 is configured to execute the computer readable instructions in memory 1016, and may be configured to execute one or more functions of the various means in apparatus 1000.

As used herein, the term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining, and the like. In addition, "determining" can include receiving (e.g., receiving information), accessing (e.g., accessing data in a memory), resolving, selecting, choosing, establishing, and the like.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary examples, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The examples disclosed herein are provided to enable any person skilled in the art to make or use the presently disclosed subject matter. Various modifications to these disclosed examples will be readily apparent to those skilled in the art, and the generic principles defined herein may be applied to other embodiments without departing from the teachings of the present disclosure. It is also noted that the word "exemplary" is used exclusively herein to mean "serving as an example, instance, or illustration." Any example described herein as "exemplary" is not necessarily to be construed as preferred or advantageous over other examples. Thus, the present disclosure is not intended to be limited to the examples shown herein, but is to be accorded the widest scope consistent with the principles and novel features disclosed herein.

The invention claimed is:

1. A method for adapting a channel estimation scheme in a transceiver in a communication system, the method comprising:
   determining at least one of an estimate of a power delay profile of a channel and a time correlation of the channel;
   determining a channel estimation scheme based on at least one of the determined power delay profile and time correlation of the channel;
   defining at least two cost functions corresponding to respective channel estimation schemes, where each cost function is based on an error between a computed channel estimate and an ideal channel estimate;
   determining an estimation of the time correlation of the channel and the power delay profile through calculating a plurality of parameters to be used in calculating each of the at least two cost functions, wherein at least one of the plurality of parameters is a time correlation parameter based on at least one Doppler correlation coefficient that correlates to a speed of the transceiver;
   calculating a cost value for each of the at least two cost functions using the plurality of parameters; and
   selecting, from a plurality of predetermined channel estimation schemes, a channel estimation scheme based on a comparison of the values of the at least two cost functions.

2. The method as defined in claim 1, further comprising:
   determining the time correlation of the channel based on at least one Doppler correlation coefficient dependent on a speed of the transceiver; and
   selecting, from a plurality of predetermined channel estimation schemes, a channel estimation scheme based on a predetermined relationship of the measured at least one Doppler correlation coefficient and the power delay profile.

3. The method as defined in claim 2, wherein the power delay profile includes at least one measured excess energy of a pilot symbol observation.

4. The method as defined in claim 2, wherein the Doppler correlation coefficient is determined by measuring a difference between pilot observations in consecutive symbols in the channel.

5. The method as defined in claim 2, wherein the at least one Doppler correlation coefficient is determined by measuring a difference between a plurality of non-consecutive pilot symbols in the channel.

6. The method as defined in claim 1, wherein the communication system is an Orthogonal Frequency Division Multiplexing system utilizing interlaced pilot tones for channel estimation.

7. The method as defined in claim 6, wherein the at least one Doppler correlation coefficient is estimated based on energies respectively output from an actual time filter and an excess time filter.

8. The method as defined in claim 7, wherein the at least one Doppler correlation coefficient is estimated by including:
   identifying time filter taps containing one of actual channel energy and excess channel energy;
   considering time filter tap energies that exceed an first energy threshold value and are less than a second energy threshold value; and
   summing the considered time filter tap energies.

9. The method as defined in claim 6, wherein the plurality of parameters includes at least one of a total channel power ($P_H$), a power of an excess time filter ($P_{He}$), a noise variance $\sigma_w^2$, a number of taps of an actual time filter ($N_{ATF}$) having an energy above a predetermined threshold energy, and $N_{ETF}$.

10. The method as defined in claim 6, wherein one or more of the plurality of parameters are estimated utilizing a Transitional Pilot Channel (TPC) channel estimate.

11. The method as defined in claim 1, wherein selecting the channel estimation scheme includes selecting from a plurality of predetermined channel estimation time filters.

12. The method as defined in claim 1, wherein the communication system is an Orthogonal Frequency Division Multiplexing (OFDM) system utilizing interlaced pilot tones for channel estimation.

13. The method as defined in claim 12, wherein the interlaced pilot tones are staggered in a pattern that repeats periodically across OFDM symbols.

14. A transceiver in a communication system comprising:
   a processor configured to:
   determine at least one of an estimate of a power delay profile of a channel and a time correlation of the channel;

determine a channel estimation scheme based on at least one of the determined power delay profile and time correlation of the channel;

define at least two cost functions corresponding to respective channel estimation schemes, where each cost function is based on an error between a computed channel estimate and an ideal channel estimate;

determine an estimation of the time correlation of the channel and the power delay profile through calculating a plurality of parameters to be used in calculating each of the at least two cost functions, wherein at least one of the plurality of parameters is a time correlation parameter based on at least one Doppler correlation coefficient that correlates to a speed of the transceiver;

calculate a cost value for each of the at least two cost functions using the plurality of parameters; and select, from a plurality of predetermined channel estimation schemes, a channel estimation scheme based on a comparison of the values of the at least two cost functions.

15. The transceiver as defined in claim 14, wherein the processor is further configured to:

determine the time correlation of the channel based on at least one Doppler correlation coefficient dependent on a speed of the transceiver; and select, from a plurality of predetermined channel estimation schemes, a channel estimation scheme based on a predetermined relationship of the measured at least one Doppler correlation coefficient and the power delay profile.

16. The transceiver as defined in claim 15, wherein the power delay profile includes at least one measured excess energy of a pilot symbol observation.

17. The transceiver as defined in claim 15, wherein the Doppler correlation coefficient is determined by measuring a difference between pilot observations in consecutive symbols in the channel.

18. The transceiver as defined in claim 15, wherein the at least one Doppler correlation coefficient is determined by measuring a difference between a plurality of non-consecutive pilot symbols in the channel.

19. The transceiver as defined in claim 14, wherein the transceiver is an Orthogonal Frequency Division Multiplexing transceiver utilizing interlaced pilot tones for channel estimation.

20. The transceiver as defined in claim 19, wherein the at least one Doppler correlation coefficient is estimated based on energies respectively output from an actual time filter and an excess time filter.

21. The transceiver as defined in claim 20, wherein the processor is configured to estimate the at least one Doppler correlation coefficient by including:

identifying time filter taps containing one of actual channel energy and excess channel energy;

considering time filter tap energies that exceed an first energy threshold value and are less than a second energy threshold value; and summing the considered time filter tap energies.

22. The transceiver as defined in claim 19, wherein the plurality of parameters includes at least one of a total channel power ($P_H$), a power of an excess time filter ($P_{He}$), a noise variance $\sigma_w^2$, a number of taps of an actual time filter ($N_{ATF}$) having an energy above a predetermined threshold energy, and $N_{ETF}$.

23. The transceiver as defined in claim 19, wherein one or more of the plurality of parameters are estimated utilizing a Transitional Pilot Channel (TPC) channel estimate.

24. The transceiver as defined in claim 14, wherein selecting the channel estimation scheme includes selecting from a plurality of predetermined channel estimation time filters.

25. The transceiver as defined in claim 14, wherein the communication system is an Orthogonal Frequency Division Multiplexing (OFDM) system utilizing interlaced pilot tones for channel estimation.

26. The transceiver as defined in claim 25, wherein the interlaced pilot tones are staggered in a pattern that repeats periodically across OFDM symbols.

27. The apparatus as defined in claim 25, further comprising:

means for determining the time correlation of the channel based on at least one Doppler correlation coefficient dependent on a speed of the transceiver; and means for selecting, from a plurality of predetermined channel estimation schemes, a channel estimation scheme based on a predetermined relationship of the measured at least one Doppler correlation coefficient and the power delay profile.

28. The apparatus as defined in claim 27, wherein the power delay profile includes at least one measured excess energy of a pilot symbol observation.

29. The apparatus as defined in claim 27, wherein the Doppler correlation coefficient is determined by measuring a difference between pilot observations in consecutive symbols in the channel.

30. The apparatus as defined in claim 27, wherein the at least one Doppler correlation coefficient is determined by measuring a difference between a plurality of non-consecutive pilot symbols in the channel.

31. An apparatus for adapting a channel estimation scheme in a transceiver in a communication system, the apparatus comprising:

at least one of means for determining an estimate of a power delay profile of a channel and means for determining a time correlation of the channel;

means for determining a channel estimation scheme based on at least one of the determined power delay profile and time correlation of the channel;

means for defining at least two cost functions corresponding to respective channel estimation schemes, where each cost function is based on an error between a computed channel estimate and an ideal channel estimate;

means for determining an estimation of the time correlation of the channel and the power delay profile through calculating a plurality of parameters to be used in calculating each of the at least two cost functions, wherein at least one of the plurality of parameters is a time correlation parameter that correlates to a speed of the transceiver;

means for calculating a cost value for each of the at least two cost functions using the plurality of parameters; and means for selecting, from a plurality of predetermined channel estimation schemes, a channel estimation scheme based on a comparison of the values of the at least two cost functions.

32. The apparatus as defined in claim 31, wherein the communication system is an Orthogonal Frequency Division Multiplexing system utilizing interlaced pilot tones for channel estimation.

33. The apparatus as defined in claim 32, wherein the at least one Doppler correlation coefficient is estimated based on energies respectively output from an actual time filter and an excess time filter.

34. The apparatus as defined in claim 33, wherein the at least one Doppler correlation coefficient is estimated by:

means for identifying time filter taps containing one of actual channel energy and excess channel energy;

means for considering time filter tap energies that exceed an first energy threshold value and are less than a second energy threshold value; and means for summing the considered time filter tap energies.

35. The apparatus as defined in claim 32, wherein the plurality of parameters includes at least one of a total channel power ($P_H$), a power of an excess time filter ($P_{He}$), a noise variance $\sigma_w^2$, a number of taps of an actual time filter ($N_{ATF}$) having an energy above a predetermined threshold energy, and $N_{ETF}$.

36. The apparatus as defined in claim 32, wherein one or more of the plurality of parameters are estimated utilizing a Transitional Pilot Channel (TPC) channel estimate.

37. The apparatus as defined in claim 31, wherein selecting the channel estimation scheme includes selecting from a plurality of predetermined channel estimation time filters.

38. The apparatus as defined in claim 31, wherein the communication system is an Orthogonal Frequency Division Multiplexing system utilizing interlaced pilot tones for channel estimation.

39. The apparatus as defined in claim 38, wherein the interlaced pilot tones are staggered in a pattern that repeats periodically across OFDM symbols.

40. A computer program product, comprising: non-transitory computer-readable medium comprising:
 code for causing a computer to determine at least one of an estimate of a power delay profile of a channel at a transceiver and a time correlation of the channel at the transceiver;
 code for causing a computer to determine a channel estimation scheme based on at least one of the determined power delay profile and time correlation of the channel;
 code for causing a computer to define at least two cost functions corresponding to respective channel estimation schemes, where each cost function is based on an error between a computed channel estimate and an ideal channel estimate;
 code for causing a computer to determine an estimation of the time correlation of the channel and the power delay profile through calculating a plurality of parameters to be used in calculating each of the at least two cost functions, wherein at least one of the plurality of parameters is a time correlation parameter based on at least one Doppler correlation coefficient that correlates to a speed of the transceiver;
 code for causing a computer to calculate a cost value for each of the at least two cost functions using the plurality of parameters; and
 code for causing a computer to select, from a plurality of predetermined channel estimation schemes, a channel estimation scheme based on a comparison of the values of the at least two cost functions.

41. The computer program product as defined in claim 40, wherein the non-transitory computer-readable medium further comprises:
 code for causing a computer to determine the time correlation of the channel based on at least one Doppler correlation coefficient dependent on a speed of the transceiver; and
 code for causing a computer to select, from a plurality of predetermined channel estimation schemes, a channel estimation scheme based on a predetermined relationship of the measured at least one Doppler correlation coefficient and the power delay profile.

42. The computer program product as defined in claim 41, wherein the power delay profile includes at least one measured excess energy of a pilot symbol observation.

43. The computer program product as defined in claim 41, wherein the Doppler correlation coefficient is determined by measuring a difference between pilot observations in consecutive symbols in the channel.

44. The computer program product as defined in claim 41, wherein the at least one Doppler correlation coefficient is determined by measuring a difference between a plurality of non-consecutive pilot symbols in the channel.

45. The computer program product as defined in claim 40, wherein the communication system is an Orthogonal Frequency Division Multiplexing system utilizing interlaced pilot tones for channel estimation.

46. The computer program product as defined in claim 45, wherein the at least one Doppler correlation coefficient is estimated based on energies respectively output from an actual time filter and an excess time filter.

47. The computer program product as defined in claim 46, wherein the non-transitory computer-readable medium further comprises:
 code for causing a computer to estimate the at least one Doppler correlation coefficient with further code including:
 code for causing a computer to identify time filter taps containing one of actual channel energy and excess channel energy;
 code for causing a computer to account for time filter tap energies that exceed an first energy threshold value and are less than a second energy threshold value; and
 code for causing a computer to sum the accounted for time filter tap energies.

48. The computer program product as defined in claim 46, wherein the plurality of parameters includes at least one of a total channel power ($P_H$), a power of an excess time filter ($P_{He}$), a noise variance $\sigma_w^2$, a number of taps of an actual time filter ($N_{ATF}$) having an energy above a predetermined threshold energy, and $N_{ETF}$.

49. The computer program product as defined in claim 46, wherein one or more of the plurality of parameters are estimated utilizing a Transitional Pilot Channel (TPC) channel estimate.

50. The computer program product as defined in claim 40, wherein selecting the channel estimation scheme includes selecting from a plurality of predetermined channel estimation time filters.

51. The computer program product as defined in claim 40, wherein the communication system is an Orthogonal Frequency Division Multiplexing (OFDM) system utilizing interlaced pilot tones for channel estimation.

52. The computer program product as defined in claim 51, wherein the interlaced pilot tones are staggered in a pattern that repeats periodically across OFDM symbols.

* * * * *